United States Patent Office 2,885,422
Patented May 5, 1959

2,885,422

STABILIZATION OF ORGANIC ISOCYANATES

Louis Spiegler, Woodbury, N.J., assignor to E. I. du Pont de Nemours and Company, Wilmington, Del., a corporation of Delaware No Drawing. Application January 27, 1956
Serial No. 561,911

3 Claims. (Cl. 260—453)

This invention relates to organic compounds, and more particularly to the stabilization of organic isocyanates against discoloration.

Organic isocyanates, which in general are colorless liquids or solids, tend to become discolored on storage. On discoloration these organic isocyanates change to from light yellow to brown in extreme cases, and while this color can be removed by distilling the isocyanates, the distilled products again become discolored on standing even in only a few hours.

The discoloration of these organic isocyanates presents a serious problem where colorless or very light colored reaction products are to be produced, for it is usually impractical to redistill the isocyanate immediately before use.

The exact cause of the color formation in the isocyanates is not known, for it has been found that when these products are stored in the light or in the dark even under nitrogen, the discoloration develops practically as fast as when the same products are stored in air. The presence of moisture is believed to be a factor in causing this discoloration, but, again, it is impractical to package isocyanates, particularly when used in large commercial quantities, under absolutely moistureproof conditions.

It is therefore an object of the present invention to provide a simple and positive method for stabilizing organic isocyanates against discoloration. It is a further object of the invention to produce organic isocyanates which for extended periods of time do not become discolored even in the presence of oxygen, moisture or light.

The present invention comprises the stabilization of organic isocyanates against discoloration by incorporating in the organic isocyanate from 0.01% to 0.5% of an essentially colorless benzylideneamine which is essentially non-reactive with organic isocyanates under ordinary atmospheric conditions, or reacts very slowly in the absence of catalysts.

These stabilizing agents are soluble in the organic isocyanates, which are normally liquids and may be readily dissolved in the melted organic isocyanates which at normal temperatures are solids. While ordinarily the amount of stabilizing agent employed will vary from 0.01% to 0.5% based on the weight of the isocyanate to be stabilized, various stabilizers hereinafter listed can be used in lesser amounts. Larger amounts of any of the stabilizers of course may be used up to their limit of solubility in the isocyanate, but unnecessary large amounts of course are to be avoided since they merely constitute an added impurity in the product. When the very small amounts are used, the effect of this impurity on the product is negligible.

The following list of aliphatic and aromatic benzylideneamines, when tested in the concentrations within the limits of those specified above and under the conditions given in the example, effectively stabilize organic isocyanates against discoloration even in the presence of oxygen, moisture or light.

*Example*

Toluene-2,4-diisocyanate is distilled at 4 to 5 mm. of mercury pressure and the colorless fraction distilling at 106° to 108° C. is collected in a four unit multiple receiver, about 45 g. being collected in each. The system is raised to atmospheric pressure by admitting dry nitrogen. The desired amounts of stabilizers, which in the following table are designated in percentages based on the weight of the isocyanate, are added to the diisocyanate in three of the receivers under an atmosphere of nitrogen, while the toluene-2,4-diisocyanate in the fourth receiver is used as a control.

Each of the four samples is then divided, again under nitrogen atmosphere, into three portions in screw cap bottles. The cap of the first bottle is screwed on tightly and taped and stored over 96% sulfuric acid. The second and third bottles are stoppered loosely so that the ambient atmosphere can come in contact with the sample, the second being stored at room temperature at 20% relative humidity while the third is allowed to stand in ordinary room atmosphere. The unstabilized toluene-2,4-diisocyanate bottles in both the 20% relative humidity and at room conditions turn light yellow in a few hours and at the end of 100 hours' exposure are brown colored. The stabilized samples in both the 20% relative humidity and in ordinary atmosphere remained colorless at the end of 100 hours' exposure.

| Concentration in percent | Stabilizer |
|---|---|
| 0.05 | Benzylidene-n-butylamine. |
| 0.05 | Benzylideneaniline. |
| 0.10 | Benzylidene-o-toluidine. |
| 0.10 | Benzylidene-p-toluidine. |
| 0.50 | Benzylidene-methylamine. |
| 0.50 | Benzylideneethylamine. |
| 0.10 | Benzylidenepropylamine. |
| 0.05 | p-Chlorobenzylideneaniline. |
| 0.05 | o-Chlorobenzylideneaniline. |
| 0.05 | p-Methoxybenzylidene-n-butylamine. |
| 0.05 | o-Chlorobenzylidenemethylamine. |
| 0.05 | o-Hydroxybenzylidenemethylamine. |
| 0.05 | p-Isopropylbenzylideneaniline. |

The compounds found to be operable in the present invention, as illustrated above, are benzylidenealkylamines or benzylidenearylamines in which the aryl group is of the benzene series.

The stabilizing effect on solid isocyanates is shown when the stabilizing agents of this invention are added to them in molten form, for example, when one of the stabilizing agents is added to pure 2,4,4'-triisocyanatodiphenyl ether, the mixture solidified and broken up under nitrogen, and then exposed under the same conditions as those given in the example.

Mixtures of isocyanates may of course be stabilized in the same manner as the individual isocyanates.

Any of the aromatic, aliphatic, cycloaliphatic, mono-, di-, or high poly-isocyanates which tend to discolor due to the presence of moisture or oxygen may be effectively stabilized against discoloration by the addition of the benzylideneamines above described. As illustrative of the various classes of diisocyanates which may be stabilized against discoloration the following list is given, any of which when substituted for the toluene-2,4-diisocyanate of the example, are stabilized against discoloration when tested according to the procedure described therein:

Toluene-2,6-diisocyanate
4,4'-methylenediphenylisocyanate
4,4'-methylenedi-ortho-tolylisocyanate
2,4,4'-triisocyanatodiphenylether
Toluene-2,4,6-triisocyanate
1-methoxy-2,4,6-benzenetriisocyanate Meta-phenylenediisocyanate
4-chloro-meta-phenylenediisocyanate
4,4'-biphenyldiisocyanate
1,5-naphthalenediisocyanate
1,4-tetramethylenediisocyanate
1,6-hexamethylenediisocyanate
1,10-decamethylenediisocyanate
1,4-cyclohexanediisocyanate
4,4'-methylene-bis(cyclohexylisocyanate)
1,5-tetrahydronaphthalenediisocyanate
Ortho-, meta- or para-tolueneisocyanate
Alpha- and beta-naphthyleneisocyanate
4-methoxy-meta-phenylenediisocyanate The conditions given in the example under which the above stabilizers are tested are quite severe when it is considered that compounds such as organic isocyanates are ordinarily shipped in sealed containers out of contact with atmospheric moisture and oxygen, and often light. When such products are stabilized with the compounds more particularly described above and sealed in iron drums, the effectiveness of the stabilizer will be many times that given for tests carried out in the presence of moisture and air.

I claim:

1. An organic isocyanate of the class consisting of aliphatic, cycloaliphatic and aromatic isocyanates stabilized against discoloration by having dissolved therein from 0.01% to 0.5% by weight, based on the isocyanate, of an essentially colorless benzylideneamine of the class consisting of benzylidenealkylamines and benzylidenearylamines in which the aryl group is of the benzene series which is essentially non-reactive with the organic isocyanate.

2. An organic isocyanate of the class consisting of aliphatic, cycloaliphatic and aromatic isocyanates stabilized against discoloration by having dissolved therein from 0.01% to 0.5% by weight, based on the isocyanate, of benzylideneaniline.

3. An organic isocyanate of the class consisting of aliphatic, cycloaliphatic and aromatic isocyanates stabilized against discoloration by having dissolved therein from 0.1% to 0.5% by weight, based on the isocyanate, of benzylidene-n-butylamine.

References Cited in the file of this patent

UNITED STATES PATENTS

| | | |
|---|---|---|
| 2,303,818 | Cantrell et al. | Dec. 1, 1942 |
| 2,303,819 | Cantrell et al. | Dec. 1, 1942 |
| 2,437,867 | Verbanc | Mar. 16, 1948 |
| 2,476,779 | Sturgis | July 19, 1949 |